(12) United States Patent
Murota

(10) Patent No.: US 10,315,283 B2
(45) Date of Patent: Jun. 11, 2019

(54) TOOL CLEANING DEVICE FOR MACHINE TOOL

(71) Applicant: FANUC Corporation, Yamanashi (JP)

(72) Inventor: Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/334,377

(22) Filed: Oct. 26, 2016

(65) Prior Publication Data

US 2017/0113314 A1 Apr. 27, 2017

(30) Foreign Application Priority Data

Oct. 27, 2015 (JP) .................... 2015-211027

(51) Int. Cl.
| | | |
|---|---|---|
| B08B 3/02 | (2006.01) |
| B08B 5/04 | (2006.01) |
| B08B 13/00 | (2006.01) |
| B23Q 11/00 | (2006.01) |
| B23Q 11/02 | (2006.01) |
| B23Q 17/24 | (2006.01) |

(Continued)

(52) U.S. Cl.
CPC ............ *B23Q 11/0046* (2013.01); *B08B 3/02* (2013.01); *B08B 5/02* (2013.01); *B08B 5/04* (2013.01); *B08B 13/00* (2013.01); *B23Q 11/005* (2013.01); *B23Q 11/02* (2013.01); *B23Q 17/2457* (2013.01); *B25J 11/0085* (2013.01); *B25J 13/086* (2013.01); *B25J 19/021* (2013.01)

(58) Field of Classification Search
CPC ............ B23Q 11/0046–11/0075; B25J 19/021
See application file for complete search history.

(56) References Cited

U.S. PATENT DOCUMENTS 4,534,803 A * 8/1985 Asano .................. B23Q 1/0018
134/102.3
5,474,116 A * 12/1995 Shoda ................ B23Q 11/0046
144/252.1

(Continued)

FOREIGN PATENT DOCUMENTS

JP 3-158189 A 7/1991
JP H5-96444 A 4/1993

(Continued)

OTHER PUBLICATIONS

JP08-150537A Machine Translation (Year: 1996).*

(Continued)

*Primary Examiner* — Spencer E Bell
(74) *Attorney, Agent, or Firm* — Hauptman Ham, LLP

(57) ABSTRACT

A tool cleaning device for a machine tool has a chip removing device which removes the chip, a moving device to which the chip removing device is attachable, a detecting device which detects a storing state of the chip to the tool of the machine tool, an information processing device which processes information according to the storing state of the chip acquired by the detecting device and judges a region where a chip removing is necessary, and a controller of the moving device which moves the chip removing device to the region where the chip removing is necessary judged by the information processing device. The chip stored on the tool is cleaned by the chip removing device.

19 Claims, 4 Drawing Sheets

(51) Int. Cl.
*B25J 11/00* (2006.01)
*B25J 13/08* (2006.01)
*B25J 19/02* (2006.01)
*B08B 5/02* (2006.01)

(56) References Cited

U.S. PATENT DOCUMENTS

| | | | |
|---|---|---|---|
| 6,471,448 B1 * | 10/2002 | Lagerberg | B23Q 11/005 407/11 |
| 2008/0203679 A1 | 8/2008 | Hermoso | |
| 2010/0293739 A1 | 11/2010 | Imamura et al. | |
| 2011/0265835 A1 | 11/2011 | Sato | |

FOREIGN PATENT DOCUMENTS

| | | | |
|---|---|---|---|
| JP | 8-150537 A | 6/1996 |
| JP | H8-243876 A | 9/1996 |
| JP | 2001038588 A | 2/2001 |
| JP | 2001322049 A | 11/2001 |
| JP | 2003-181740 A | 7/2003 |
| JP | 2009113182 A | 5/2009 |
| JP | 2010-158726 A | 7/2010 |
| JP | 2015-109321 A | 6/2015 |

OTHER PUBLICATIONS

Office Action in JP Application No. 2015-211027, dated Oct. 24, 2017, 12pp.
Office Action in Japanese Application No. 2015-211027, dated Jul. 31, 2018, 12 pp.

* cited by examiner

TOOL CLEANING DEVICE FOR MACHINE TOOL

RELATED APPLICATIONS

The present application claims priority to Japanese Patent Application Number 2015-211027, filed Oct. 27, 2015, the disclosure of which is hereby incorporated by reference herein in its entirety.

BACKGROUND OF THE INVENTION

1. Field of the Invention

The present invention relates to a tool cleaning device for a machine tool using a robot and a detecting device.

2. Description of the Related Art

Generally, in a machine tool, cutting fluid is provided to a tool knife edge from an outside during machining, and a chip generated during the machining is removed. However, the chip may be twined around and adhered to the tool knife edge because of the shape of the chip generated during the machining. Further, a chip amount may be gradually increased and stored as a machining number is increased.

Further, the chip generated during the machining is scattered in the machine tool and moved toward a tool knife edge of a standby tool held by a tool magazine, and the chip may be adhered to the tool knife edge due to viscosity of the cutting fluid, and also in this case, the chip amount adhered to the tool knife edge of the standby tool may be gradually increased and stored as the machining number is increased. When the machining is started in a state in which the chip is adhered to the tool knife edge of the tool, various undesirable matters may be occurred, for example workability is deteriorated, or since the chip is rotated together with the tool during the machining, a machining work is damaged. Generally, a removing operation of such a chip adhered to the tool knife edge is needed to be performed by hands of an operator.

On the other hand, a system which controls a direction and a position of a cleaning device attached to a robot is proposed. In the prior art, by moving the cleaning device inside the machine tool, the chip can be removed across a wide region inside the machine tool.

In JP 2009-113182 A discloses an automatic cleaning device for a machine tool in which an air nozzle which removes a chip or cutting oil scattered during machining of a work toward outside of the machine tool by means of an air blowing is movable independently against a movement of a spindle head and movable relatively against the work in three directions orthogonal to each other. Further, JP 2001-322049 A discloses a device which sucks and discharges a chip by controlling a cleaning robot. The cleaning robot having a nozzle, which sucks the chip, arranged at a tip of an arm is arranged on a movable body such as a cross rail or a spindle head of the machine tool, and in the device, a moving path in which the nozzle can suck the chip while moving is designed and only a path data of an interference region excluding a region in which the nozzle interferes with the machining tool is output in a time defined by a machining program for machining a work by the tool in order to control the cleaning robot. Further, JP 2001-038588 A discloses a means for automatically cleaning a tool by arranging the tool in a tool preparing part provided together with a tool magazine and injecting a cleaning agent from the nozzle.

The cleaning robots described in the background of the invention are operated in accordance with a predetermined program and therefore an actual storing state of the chip is not considered. Accordingly, the cleaning may be performed more than necessary, or the next machining may be performed in a state in which the chip is still remained.

SUMMARY OF THE INVENTION

Accordingly, an object of the present invention is to provide a tool cleaning device for a machine tool using a robot and a detecting device capable of performing a tool cleaning while judging a region where a cleaning is necessary based on a storing state of a chip by using the detecting device which detects the storing state of the chip to a tool.

The tool cleaning device for the machine tool according to the present invention is a tool cleaning device for a machine tool which removes a chip adhered to a tool of the machine tool, and the device includes: a chip removing device which removes the chip; a moving device to which the chip removing device is attachable; a detecting device which detects a storing state of the chip to the tool of the machine tool; an information processing device which processes information according to the storing state of the chip acquired by the detecting device and judges a region where a chip removing is necessary; and a controller of the moving device which moves the chip removing device to the region where the chip removing is necessary judged by the information processing device.

In the tool cleaning device for the machine tool, the detecting device may detect the storing state of the chip to the tool after the chip removing device performs the chip removing, and the chip removing may be repeatedly performed until it is judged by the information processing device that the chip is removed. Then, when the chip removing is repeatedly performed, operation of the chip removing device may be set to be different from the previous operation.

The chip removing device may remove the chip by injecting fluid. Alternatively, the chip removing device may remove the chip by sucking the chip together with fluid. Alternatively, the chip removing device may remove the chip by injecting fluid when a main axis is rotating. Alternatively, the chip removing device may remove the chip by sucking the chip together with fluid when a main axis is rotating.

The moving device may be a robot.

The detecting device may be a vision sensor. Alternatively, the detecting device may be a distance sensor. Then, the detecting device may be mounted to the moving device.

The information processing device may be embedded into a controller of the moving device.

A mark or a pattern may be provided on the tool, and the information processing device may judge a region where the mark or the pattern cannot be recognized after the machining to be a region where a cleaning is necessary.

Furthermore, the tool cleaning device for the machine tool according to the present invention further includes an informing unit which informs that the chip removing by hands of an operator is necessary, and the information processing device may judge whether the chip removing is performed by the chip removing device or by the hands of the operator, and in a case in which it is judged that the chip removing should be performed by the hands of the operator, the informing unit may inform that the chip removing is necessary.

According to the present invention, the tool cleaning device for the machine tool using the robot and the detecting device capable of performing the tool cleaning while judging the region where the cleaning is necessary based on the storing state of the chip by using the detecting device which detects the storing state of the chip to the tool arranged inside the machine tool.

BRIEF DESCRIPTION OF THE DRAWINGS

The aforementioned and other objects and features of the present invention are understood by reading a description of a following embodiment in conjunction with accompanying drawings. In the drawings.

DETAILED DESCRIPTION OF THE PREFERRED EMBODIMENTS

Hereinafter, an embodiment of the present invention is described with reference to drawings.

Figure 1:
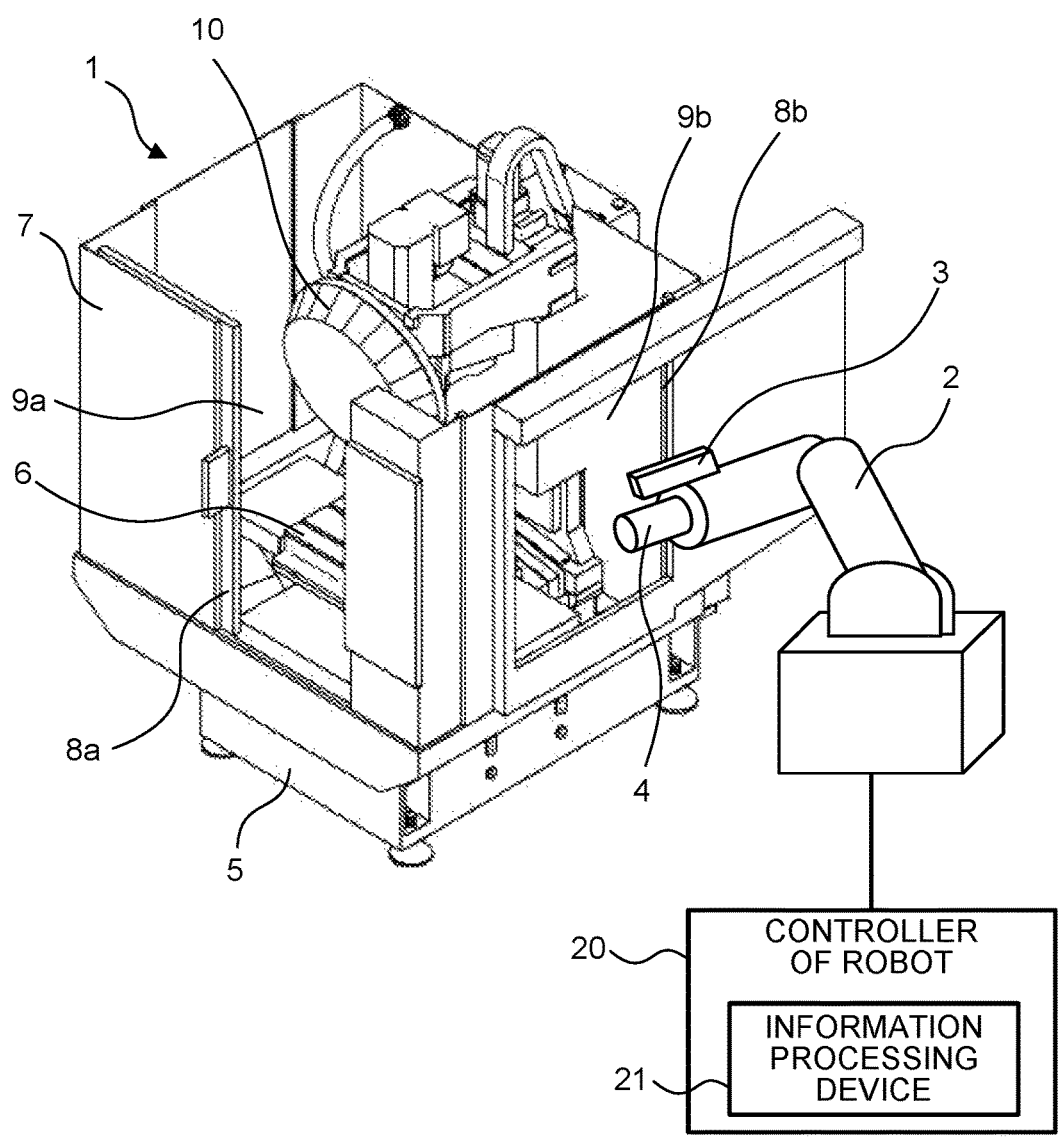
FIG. 1 shows a tool cleaning device for a machine tool according to one embodiment of the present invention.

FIG. 1 shows a tool cleaning device for a machine tool using a robot and a detecting device. The tool cleaning device for the machine tool is provided with a machine tool 1, a robot 2 arranged outside of the machine tool 1, a chip removing device 4 such as a coolant gun mounted to the robot 2, a detecting device 3 such as a vision sensor mounted to the robot 2 as a moving device, and an information processing device 21 installed in a controller 20 of the robot.

The machine tool 1 has a splash guard 7, which shuts out an inside of the machine tool provided as a machining space from an outside, arranged on a bed 5, and prevents machining fluid or a chip generated due to machining of a work from being scattered from the inside of the machine tool toward the outside. Opening parts 9a, 9b are formed in the splash guard 7 and openable and closable doors 8a, 8b are mounted to the opening parts 9a, 9b respectively. A table 6 on which a work (not shown) is arranged, and a tool replacing device 10 which replaces a tool (not shown) are arranged in the machine tool. The machine tool 1 is controlled by a controller (not shown) of the machine tool and performs the machining of the work.

The robot 2 has an articulated arm controlled by a controller 20 of the robot. A chip removing device 4 such as a coolant gun is mounted to a tip of the arm.

The controller 20 of the robot has an information processing device 21.

The robot 2 is formed to enter the tip of the arm from the opening part 9b into the inside of the machine tool during the machining of the work by the machine tool 1 is not performed, and to detect a storing state of the chip to the respective tools by using the detecting device 3 such as a vision sensor mounted to the robot 2, and to remove the stored chips by using the chip removing device 4 mounted to the tip of the arm. Here, the chip removing device may be held by a hand device mounted to a tip of the robot 2. A removing method of the chip is, for example, in a case in which the chip removing device 4 is provided as the coolant gun, by injecting cutting fluid or coolant used in the machining of the work from the coolant gun and by cleaning the chip stored on the tool and by discharging the chip to the outside of the machine tool, the chip is removed. Further, a chip removing may be performed not only by injecting the cutting fluid but also sucking the chip together with liquid such as air or the cutting fluid. The information processing device 21 is formed to process information according to the storing state of the chip detected by the detecting device 3 such as the vision sensor, and to perform processing of judging a region where the chip removing is necessary. Here, the information processing device 21 may be embedded in the controller 20 of the robot or may be provided independently form the controller 20 of the robot.

Hereinafter, an example of a judging method of the region where the cleaning is necessary by using the detecting device which detects the storing state of the chip to the tool is described.

(1) A Method Using a Template Image

The vision sensor is used as the detecting device 3. An image of an outer appearance of the tool is taken by the vision sensor. The information processing device 21 compares an image taken when the chip is not stored to the tool as a template image in advance with an image taken after the machining of the work is performed. Since brightness of the image in a region where the chip is stored is different from the template image, the information processing device 21 can judge the region where a brightness different between them exceeds a predetermined threshold to be a region where the cleaning is necessary.

(2) A Method Arranging a Mark on the Tool

Figure 2:
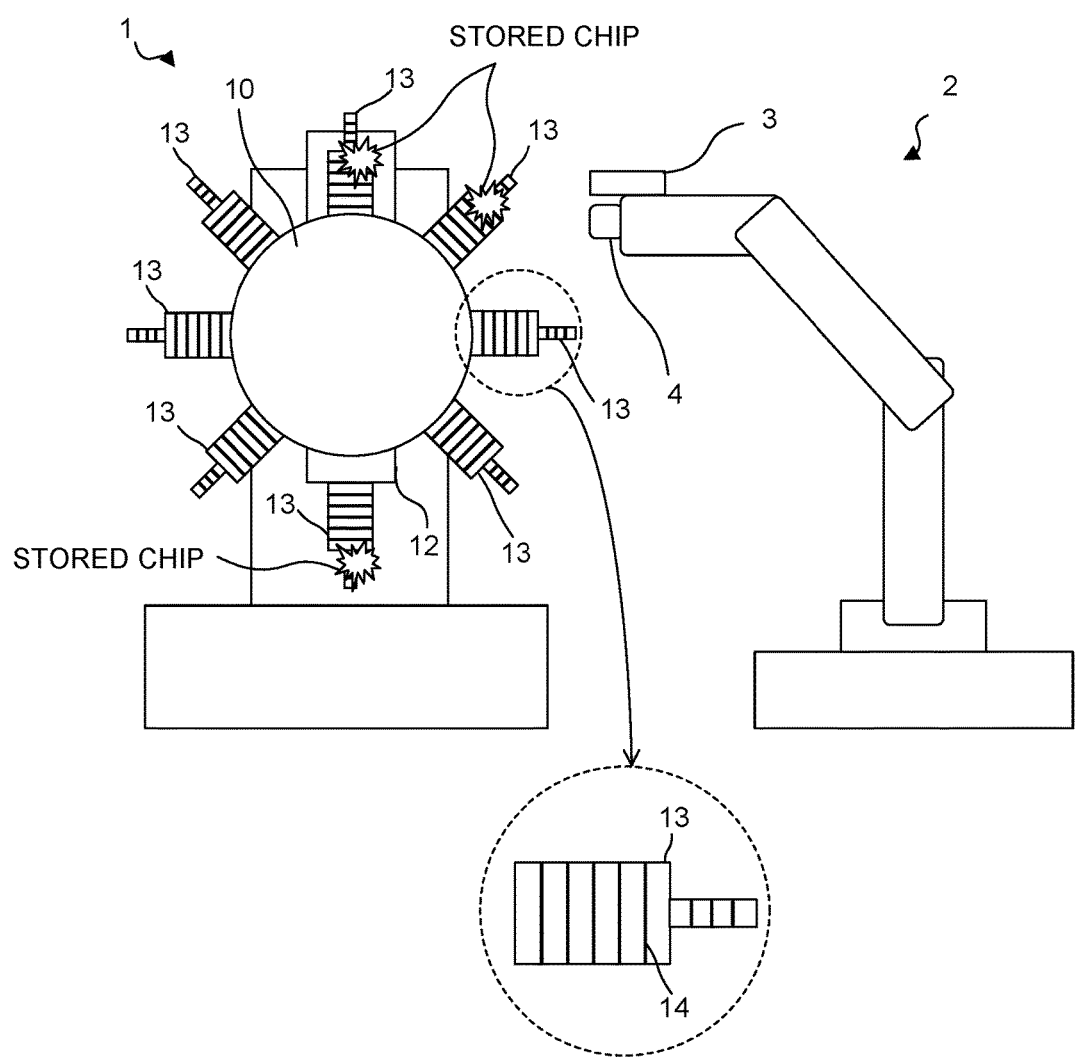
FIG. 2 shows an example of a tool in which a pattern is arranged on an outer peripheral part according to the present invention.

The vision sensor is used as the detecting device 3. FIG. 2 shows an example of an arrangement of a pattern onto the tool. A specific pattern 14 or a mark (not shown) is arranged in advance on a tool 13 held by the tool replacing device 10 or a main axis 12. The information processing device 21 controls the robot 2 to take an image of an outer appearance of the tool 13 after processing by using the vision sensor, and judges a region where the pattern 14 or the mark is not recognized to be a region where the cleaning is necessary. In FIG. 2, the pattern 14 is arranged on an outer peripheral surface of the tool 13.

(3) A Method Measuring a Distance to the Tool

A distance sensor is used as the detecting device 3. The distance sensor is formed to measure a distance to an object, and it is known as a general type of distance sensor in which infrared light or a laser beam is emitted to the object and the distance is calculated based on a time of the light going to and coming back. The information processing device 21 compares information of the distance between a predetermined point and the tool stored in advance after measuring the distance by using the distance sensor in a state in which the chip is not stored with information of the distance between the predetermined point and the tool after the machining. The information processing device 21 judges a region where a change of the distance exceeds a predetermined threshold to be a region where the cleaning is necessary.

In each method of (1), (2) and (3) described above, by detecting from one or more angles to the respective tools 13 arranged in the machine tool 1, detection accuracy can be improved.

When the cleaning of the chip is performed, the controller 20 of the robot controls the robot 2 to move the chip removing device 4 mounted to the robot 2 to the region where the cleaning is necessary and controls the chip removing device 4 to remove the chip. After that, the controller 20 of the robot controls the robot 2 and the detecting device 3 and checks whether the chip is sufficiently removed by acquiring the state of the tool 13 again and judging the region where the cleaning is necessary. After the cleaning, when it is judged that the chip is still stored, it is judged that the cleaning is insufficient and the cleaning is performed again. These operations are repeated until it is judged that the chip is removed.

When the chip removing is repeatedly performed, a chip removing operation may be changed as the operation of the chip removing device 4 is repeated. For example, the controller 20 of the robot may change the control of the robot 2 and the coolant gun the chip removing device 4 as a chip removing control is repeated such that injection pressure of the fluid to be injected is changed, the injection pressure of the fluid to be injected is fluctuated, or an injection direction of the fluid to the storing region of the chip is changed. Further, in a case in which the chip is sucked together with the fluid, the controller 20 of the robot may change the control of the robot 2 and a sucking nozzle as the chip removing device 4 as the chip removing control is repeated such that sucking pressure of the fluid to be sucked is changed, the sucking pressure of the fluid to be sucked is fluctuated, or a sucking direction of the fluid from the storing region of the chip is changed. Further, examples of the fluid to be injected by the coolant gun as the chip removing device 4 include cleaning fluid, cutting fluid, compression air and the combined fluid thereof. Further, examples of the fluid to be sucked by the sucking nozzle as the chip removing device 4 include air and cutting fluid.

Figure 3:
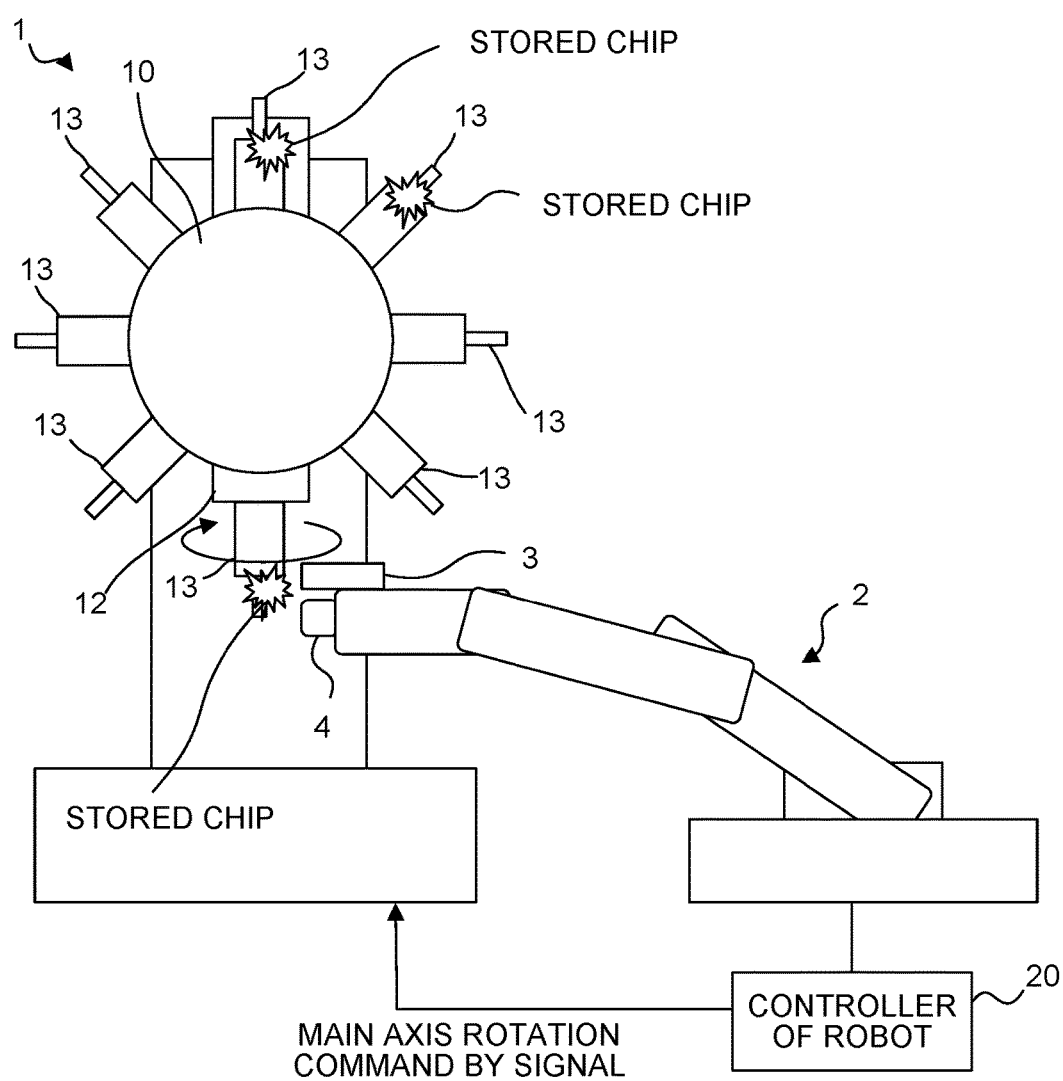
FIG. 3 is a schematic diagram showing a configuration in which a tool cleaning is performed together with a rotation of a main axis in the tool cleaning device for the machine tool according to the present invention.

Further, when the tool 13 held by the main axis 12 is cleaned, as shown in FIG. 3, the main axis 12 may be rotated in a clockwise direction, in a counterclockwise direction or in both directions thereof by outputting a signal to the controller of the machine tool 1 in conjunction with one of the cleaning methods described above. With such a configuration, a higher cleaning effect can be obtained.

Further, it may be faster that the chip removing operation is performed by hands of an operator compared to that the chip removing operation is performed by the chip removing device 4 in some storing region of the chip. Thus, when the chip removing operation by the chip removing device 4 is repeated at more than a predetermined number or time, the controller 20 of the robot may judge that the chip removing operation should be performed by the hand of the operator and may inform the operator of the storing of the chip.

Further, a kind of the tool where it was informed to the operator before that the chip removing operation should be performed by the hands of the operator or a tool where it is registered by the operator in advance that the cleaning should be performed by the hands of the operator may be stored, and when it is judged that the chip is stored on the stored tool, it is informed to the operator and therefore a cleaning time by using the chip removing device 4 can be omitted.

In each case, after the chip is removed by the operator, the machine tool 1 proceeds to a next step. Further, the chip removing operation may be performed by the operator in the daytime and the chip removing operation is switched to the chip removing device 4 in the nighttime when the operator is absent. Examples of an informing unit include a unit for informing only the storing of the chip by using a PATLITE (registered trademark) and a unit for informing the storing region of the chip such as a position of the tool or a number assigned to the tool on which the chip is stored.

Further, taking the image of the tool 13 by the vision sensor as the detecting device 3 or the tool cleaning may not be performed after the every machining, and it may be performed after a predetermined number of the machining is performed. When it is found in advance that the storing amount of the chip is less and the cleaning is not necessary, the tool cleaning device is not operated, and therefore the cleaning time can be reduced.

Figure 4:
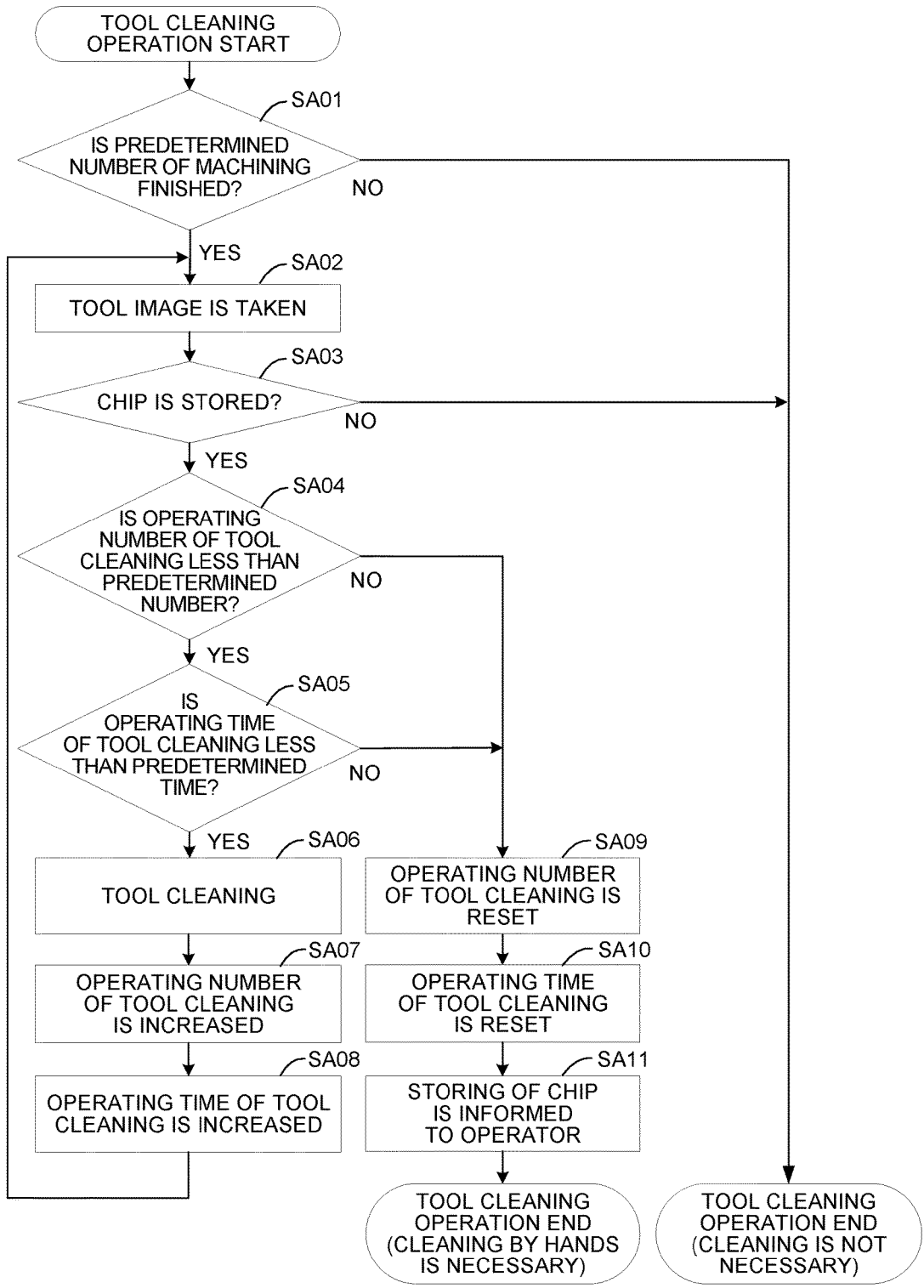
FIG. 4 is a flow chart of processing performed by the tool cleaning device for the machine tool according to the one embodiment of the present invention.

FIG. 4 is one example of a flow chart of the processing performed by the tool cleaning device for the machine tool using the robot and the detecting device which detects the storing state of the chip to the tool. The flow chart shown in FIG. 4 shows the processing in which the chip stored on the tool is detected automatically and removed by using the chip removing device 4, and when the chip removing operation by the chip removing device 4 is repeated at more than a predetermined number or time, the storing of the chip is informed to the operator after judging the chip removing operation should be performed by the hands of the operator. Further, as an initial setting when the processing shown in FIG. 4 is started, an operating number of the tool cleaning and an operating time of the tool cleaning have been reset.

Hereinafter, each step is described.

Step SA01

The controller 20 of the robot judges whether a predetermined number of the machining is finished based on a signal received from the controller of the machine tool, and in a case in which the predetermined number of the machining is finished (YES), it is proceeded to Step SA02, and in a case in which the predetermined number of the machining is not finished (NO), the controller 20 recognizes that the cleaning is not necessary and the tool cleaning operation is ended.

Step SA02

The controller 20 of the robot moves the robot 2 to the inside of the machine tool 1 by controlling the robot 2, and takes images of the tool 13 held by the main axis 12 and the tool 13 held by the tool replacing device 10.

Step SA03

The information processing device 21 judges whether the chip is stored on the each tool 13 that the image is taken in Step SA02, and in a case in which the chip is stored (YES), it is proceeded to Step SA04, and in a case in which the chip is not stored (NO), the information processing device 21 recognizes that the cleaning is not necessary and the tool cleaning operation is ended.

Step SA04

The controller 20 of the robot judges whether the operating number of the tool cleaning operation is less than the predetermined number, and in a case in which the operating number is less than the predetermined number (YES), it is proceeded to Step SA05, and in a case in which the operating number exceeds the predetermined number (NO), it is proceeded to Step SA09.

Step SA05

The controller 20 of the robot judges whether the operating time of the tool cleaning operation is less than the predetermined time, and in a case in which the operating time is less than the predetermined time (YES), it is proceeded to Step SA06, and in a case in which the operating time exceeds the predetermined time (NO), it is proceeded to Step SA09. Step SA06

The controller 20 of the robot controls the robot 2 and the chip removing device 4 in order to remove the chip stored on the tool and cleans the tool.

Step SA07

The operating number of the tool cleaning operation is increased (+1).

Step SA08
The operating time of the tool cleaning operation is increased (+cleaning time of this operation) and it is proceeded to Step SA02.

Step SA09
The operating number of the tool cleaning operation is reset (=0).

Step SA10
The operating time of the tool cleaning operation is reset (=0).

Step SA11
The controller 20 of the robot controls the informing unit and informs the operator of the storing state of the chip, and it is recognized that the cleaning is necessary and the tool cleaning operation is ended.

As described above, the embodiment of the present invention is described, however the present invention is not limited to the example of the embodiment described above, and various aspects can be adopted by adding an appropriate modification to the embodiment.

For example, the machine tool having the splashing guard is shown in FIG. 1, however the present invention may be applied to the machine tool without the splash guard. Further, in FIG. 1, the robot is shown as an example of the moving device and the robot is arranged outside of the machine tool having the splash guard, however the moving device may be arranged inside of the machine tool 1 having the splash guard. Further, the chip removing device is not limited to the coolant gun which injects the fluid or the sucking nozzle which sucks the fluid, and a unit which does not use the fluid, for example a brush, a wiper, or a part of a body of the moving device may be used as the chip removing device.

As described above, the embodiment of the present invention is described, however the present invention is not limited to the example of the embodiment described above, and various aspects can be adopted by adding an appropriate modification to the embodiment.

The invention claimed is:

1. A tool cleaning device for removing chips adhered to a tool of a machine tool, the tool cleaning device comprising:
   a chip removing device configured to remove the chips by injecting liquid at the chips;
   a moving device to which the chip removing device is attachable;
   a detecting device configured to detect an accumulation status of the chips adhered to the tool of the machine tool; and
   a controller configured to
      process information according to the accumulation status of the chips acquired by the detecting device to judge a region where a chip removing operation is necessary,
      control the moving device to move the chip removing device to the region where the chip removing operation is necessary, and
      based on the accumulation status of the chips, control a pressure of the liquid injected at the chips.

2. The tool cleaning device according to claim 1, wherein the detecting device is configured to detect the accumulation status of the chips adhered to the tool after the chip removing device performs the chip removing operation, and
   the chip removing device is configured to repeatedly perform the chip removing operation until the controller judges that the chips have been removed.

3. The tool cleaning device according to claim 1, wherein when the chip removing operation is repeatedly performed, operation of the chip removing device is set to be different from a previous operation, the chip removing device is configured to remove the chips by injecting liquid when a main axis of the tool is rotating.

4. The tool cleaning device according to claim 3, wherein the chip removing device is configured to remove the chips by injecting the liquid at varied liquid injection pressures.

5. The tool cleaning device according to claim 3, wherein the chip removing device is configured to remove the chips by injecting the liquid in varied liquid injection directions.

6. The tool cleaning device according to claim 1, wherein the chip removing device is configured to remove the chips by injecting the liquid when a main axis of the tool is rotating.

7. The tool cleaning device according to claim 1, wherein the moving device is a robot.

8. The tool cleaning device according to claim 1, wherein the detecting device is a vision sensor.

9. The tool cleaning device according to claim 1, wherein the detecting device is a distance sensor.

10. The tool cleaning device according to claim 9, wherein the distance sensor is configured to detect the accumulation status of the chips adhered to the tool by using a light beam.

11. The tool cleaning device according to claim 1, wherein the detecting device is mounted to the moving device.

12. The tool cleaning device according to claim 1, wherein
   a visual mark or pattern is provided on the tool,
   the detecting device is further configured to detect the visual mark or pattern provided on the tool, and
   when the detecting device does not detect the visual mark or pattern in a region due to an accumulation of chips on the visual mark or pattern, the controller is configured to judge that a cleaning is necessary in the region.

13. A tool cleaning device for removing chips adhered to a tool of a machine tool, the tool cleaning device comprising:
   a chip removing device configured to remove the chips by injecting liquid at the chips;
   a moving device to which the chip removing device is attachable;
   a detecting device configured to detect an accumulation status of the chips adhered to the tool of the machine tool; and
   a controller configured to
      process information according to the accumulation status of the chips acquired by the detecting device to judge a region where a chip removing operation is necessary,
      control the moving device to move the chip removing device to the region where the chip removing operation is necessary, and
      based on the accumulation status of the chips, control a pressure of the liquid injected at the chips,
   wherein
   the chip removing device is configured to remove the chips by further sucking the chips together with the liquid.

14. The tool cleaning device according to claim 13, wherein the chip removing device is configured to remove the chips by sucking the chips together with the liquid when a main axis of the tool is rotating.

15. The tool cleaning device according to claim 13, wherein the moving device is a robot.

16. The tool cleaning device according to claim 13, wherein the detecting device is a vision sensor.

17. The tool cleaning device according to claim 13, wherein the detecting device is a distance sensor.

18. The tool cleaning device according to claim 13, wherein the detecting device is mounted to the moving device.

19. The tool cleaning device according to claim 13, further comprising a visual mark or pattern provided on the tool, wherein the detecting device is further configured to detect the visual mark or pattern provided on the tool, and when the detecting device does not detect the visual mark or pattern in a region due to an accumulation of chips on the visual mark or pattern, the controller is configured to judge that a cleaning is necessary in the region.

* * * * *